Feb. 7, 1933.   G. HOLMES   1,896,362
LANDING FOR MINE CAGES
Filed Feb. 27, 1930
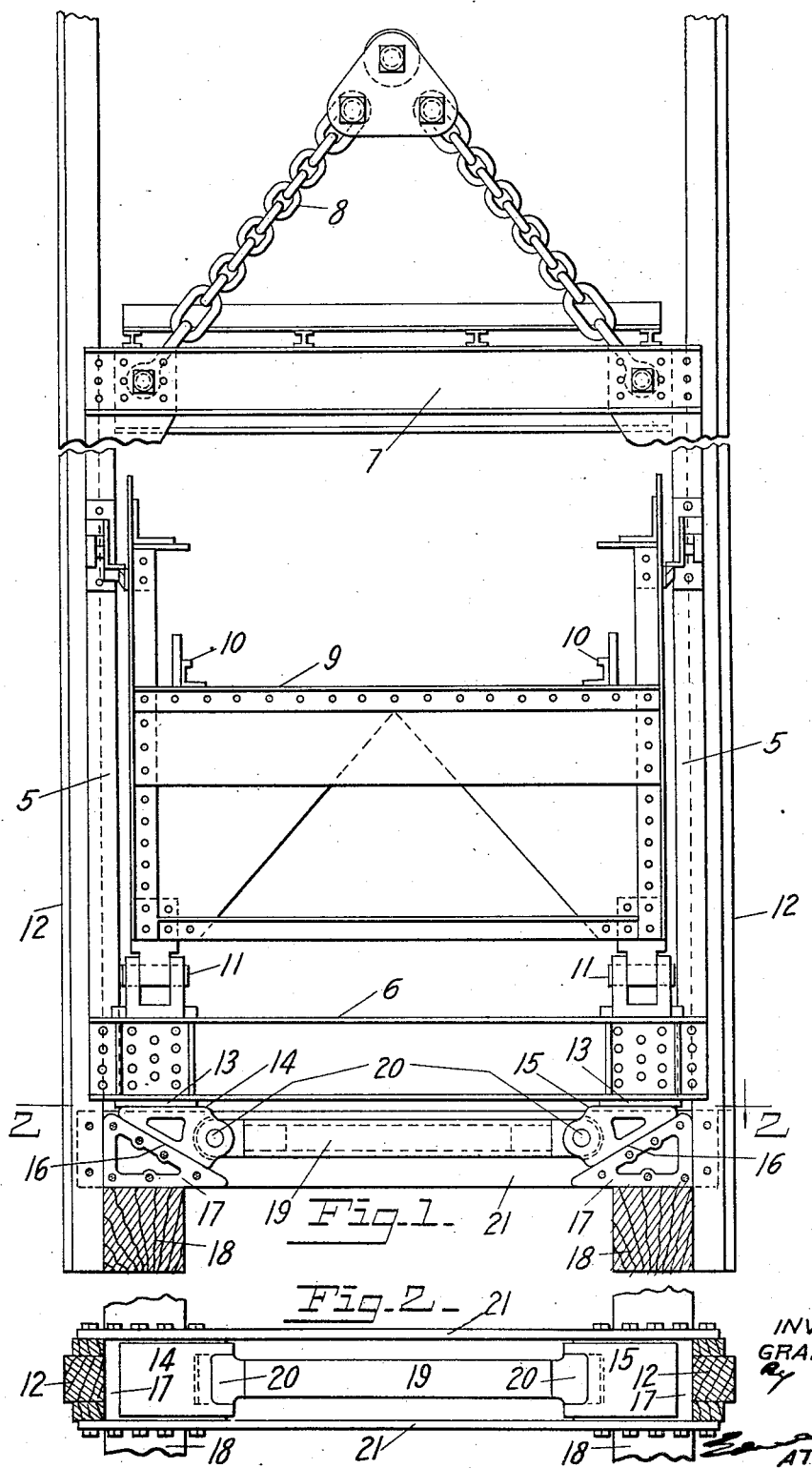
INVENTOR.
GRANT HOLMES.
ATTORNEY.

Patented Feb. 7, 1933

1,896,362

UNITED STATES PATENT OFFICE

GRANT HOLMES, OF DANVILLE, ILLINOIS, ASSIGNOR TO ROBT. HOLMES & BROS. INC., OF DANVILLE, ILLINOIS, A CORPORATION OF ILLINOIS

LANDING FOR MINE CAGES

Application filed February 27, 1930. Serial No. 431,739.

This invention relates to a landing for mine cages and the like. Mine cages are employed for elevating loaded coal cars from the mine to the point of discharge, where they are dumped and then again lowered into the mine, a suitable landing, usually comprising timbers, being provided to check the downward movement of the cage at the bottom of the shaft. The cages are operated at high speed and are subjected to severe abuse and much difficulty is encountered in maintaining the landing timbers in alinement. Because of the impact with which the cage strikes the timbers the latter are often battered out of alinement and, further, coal or other substances will accumulate on one of the timbers so as to elevate the upper surface thereof above the upper surface of the other timber. In either instance the downward movement at one side of the cage will be interrupted before the downward movement of the other side of the cage is interrupted, thereby subjecting the cage to a severe strain and causing the loosening of the rivets and the distortion or other injury of the cage.

One object of the invention is to provide a landing which will automatically adjust itself so as to simultaneously check the downward movement of both sides of the cage.

A further object of the invention is to provide a self-adjusting landing which will be simple in its construction and can be easily maintained in repair.

Other objects of the invention will appear as the apparatus is described in detail.

In the accompanying drawing Fig. 1 is a side elevation, partly in section, of the mine cage and a portion of the shaft, showing the latter equipped with the improved landing; and Fig. 2 is a section taken on the line 2—2 of Fig. 1 showing the landing in plan.

In this drawing I have illustrated one embodiment of the invention and have shown the same as comprising two separate landing members connected one to the other for simultaneous movement in opposite directions but it will be understood that this particular embodiment has been chosen for the purposes of illustration only and that the landing may take various forms without departing from the spirit of the invention.

Mine cages are of various forms and the one here shown comprises side members 5 having rigidly secured to their lower ends a transverse member 6, preferably formed of channel iron, and having secured to their upper ends a transverse member 7. A bail 8, preferably formed of chains, is connected with the upper transverse member 7 and provides means for connecting the cage with the hoisting cable, not here shown. Supported on the frame members of the cage is a platform 9 having tracks 10 to receive a mine car, this platform being in the present instance supported approximately midway between the upper and lower ends of the cage and being pivotally supported upon the lower transverse member 6, as shown at 11, whereby it may be tilted to tilt the car and discharge the contents of the latter. Suitable means are provided for securing the car in position on the platform and for controlling the dumping thereof, but as these form no part of the present invention they need not be here shown or described in detail. The cage is slidably mounted on upright guides 12 arranged in the shaft and usually the bottom member 6 of the cage is provided with landing surfaces 13, such as metal plates rigidly secured thereto near the respective ends of the member 6.

In order that the downward movement of both sides of the cage may be checked simultaneously, thereby avoiding the imposition of strain on the cage, I have provided a landing consisting of two parts arranged in the path of and adapted to be engaged by the respective portions or landing surfaces 13 of the cage. These two parts of the landing are movable with relation one to the other and are so connected one to the other that the downward movement of one part will impart upward movement to the other part. Thus if one part of the landing is elevated above the other, or if a lump of coal or some other substance rests upon one part of the landing, that part of the landing will be first engaged by the cage but instead of checking the movement of the cage it will move downwardly under the impact of the cage and will thus cause the other member to move upwardly until the latter also engages with the cage. When both members are in contact with the cage the movement of the latter will be checked. The landing may take various forms and the relative movement of the two parts may be brought about in various ways but, in the present instance, I have shown the landing as comprising two separate parts or contact members 14 and 15 arranged in line with the respective contact surfaces 13 of the cage and each having its lower surface inclined, as shown at 16. The lower inclined surfaces of the landing members 14 and 15 are supported upon correspondingly inclined surfaces of fixed supporting members 17 which, in the present instance, are mounted on timbers 18, and may be rigidly connected one to the other by transverse bars or plates 21. The upper surfaces of the supporting member 17 are inclined downwardly and inwardly and the two landing members 14 and 15 are so connected one to the other that when one landing member is forced downwardly on its inclined support the other will be forced upwardly on its inclined support. In the construction here shown the two landing members are connected by a rigid bar 19 pivotally connected at its ends with the respective landing members, as shown at 20, this bar being in the present instance, tubular in form. It will be apparent that should the supporting members 17 be vertically displaced with relation one to the other, or should there be a lump of coal on the one landing member when the latter is engaged by the cage, the two landing members will automatically position themselves so as to bring the upper surfaces thereof into alinement and thus simultaneously interrupt the movement of both sides of the cage. It will be understood, of course, that if there is a lump of coal on one landing member this lump will be crushed but that the powdered coal or a part thereof will remain on the landing member and thus elevate the effective surface of that landing member above the surface of the other landing member. As the cage approaches the lower limit of its movement it will first engage that landing member having the higher surface and the landing member will be moved downwardly by the pressure exerted thereon by the cage until the other landing member has moved up far enough to engage the opposite side of the cage, at which time the movement of both landing members will be checked and the downward movement of the cage interrupted.

It is not essential to the operation of the device that the landing members should be separate one from the other or that they should be slidably mounted but I prefer the construction here illustrated because it is easier to maintain in an operative condition than would be a construction in which the landing members were carried by a pivoted support.

While I have shown and described one embodiment of my invention I wish it to be understood that I do not desire to be limited to the details thereof as various modifications may occur to a person skilled in the art.

Having now fully described my invention, what I claim as new and desire to secure by Letters Patent, is:

1. A landing for a mine cage or the like, comprising two movable parts arranged in the paths of the respective sides of said cage and means controlled by the downward movement of one of said parts to cause a corresponding upward movement to be imparted to the other part.

2. A landing for a mine cage or the like comprising two landing members arranged to be engaged by the respective side portions of said cage, means for supporting said landing members for movement in oppositely inclined planes, and means for connecting said landing members one to the other to cause them to move simultaneously in opposite directions.

3. A landing for a mine cage or the like comprising supporting members having oppositely inclined faces, landing members slidably mounted on the inclined faces of the respective supporting members and arranged to be engaged by the respective side portions of said cage, and means for so connecting said landing members one to the other that the movement of one landing member in one direction will cause the other landing member to move in the other direction.

4. A landing for a mine cage or the like comprising supporting members having oppositely inclined faces, landing members slidably mounted on the inclined faces of the respective supporting members and arranged to be engaged by the respective side portions of said cage, and a rigid member pivotally connected with the respective landing members.

5. A landing for a mine cage or the like, comprising two rigidly mounted supporting members each having its upper surface inclined downwardly and inwardly, two landing members having their upper surfaces arranged to be engaged by the respective side portions of said cage and having their lower surfaces inclined and slidably mounted upon the inclined surfaces of the respective supporting members, and a rigid bar extending between and pivotally connected with said landing members.

6. A landing for a mine cage or the like comprising supporting members having oppositely sloping surfaces, landing members supported on the sloping surfaces of the respective supporting members and having parts arranged to be engaged by the respective side portions of said cage, and a bar connecting said landing members one to the other to cause the same to move simultaneously in opposite directions.

7. A landing for a mine cage or the like comprising fixed supports, landing members movably mounted on said supports, connected one to the other and arranged to be engaged by the respective side portions of said cage, said landing members and said supports having cooperating parts to cause both landing members to be held against movement when they are simultaneously engaged by said cage and to cause said landing members to be moved in opposite directions when one landing member only is engaged by said cage.

8. A landing for a mine cage or the like comprising two parts mounted for up and down movement and arranged to be engaged by the respective side portions of said cage, and means for causing said parts to be moved in opposite directions when one of said parts is engaged by said cage before the other part is engaged by said cage.

9. A landing for a mine cage or the like comprising supporting members, landing members supported by the respective supporting members for up and down movement with relation thereto and having parts arranged to be engaged by the respective side portions of said cage, and a bar connecting said landing members one to the other to cause them to move in opposite directions.

In testimony whereof, I affix my signature hereto.

GRANT HOLMES.